(12) United States Patent
Bogat (10) Patent No.: US 7,453,347 B1
(45) Date of Patent: Nov. 18, 2008

(54) SYSTEM FOR DISPLAYING AN INFORMATION PACKAGE

(75) Inventor: Antonio R. J. Bogat, Duluth, GA (US)

(73) Assignee: NCR Corporation, Dayton, OH (US)

( * ) Notice: Subject to any disclaimer, the term of this patent is extended or adjusted under 35 U.S.C. 154(b) by 272 days.

(21) Appl. No.: 11/058,334

(22) Filed: Feb. 15, 2005

(51) Int. Cl.
H04Q 5/22 (2006.01)

(52) U.S. Cl. .................. 340/10.1; 340/10.3; 340/10.31; 340/10.42; 340/5.41; 340/572.1; 235/375; 235/376; 706/7; 706/10

(58) Field of Classification Search ................ 340/10.1, 340/10.3, 10.31, 10.42, 5.2, 5.21, 572.1, 340/572.4, 573.1; 235/375–376; 705/7, 705/10
See application file for complete search history.

(56) References Cited

U.S. PATENT DOCUMENTS

| | | | | |
|---|---|---|---|---|
| 5,796,351 A | * | 8/1998 | Yabuki | 340/825.69 |
| 5,914,671 A | * | 6/1999 | Tuttle | 340/10.42 |
| 6,285,963 B1 | * | 9/2001 | West | 702/117 |
| 6,513,015 B2 | * | 1/2003 | Ogasawara | 705/26 |
| 6,662,215 B1 | * | 12/2003 | Moskowitz et al. | 709/217 |
| 6,970,088 B2 | * | 11/2005 | Kovach | 340/572.1 |
| 7,023,356 B2 | * | 4/2006 | Burkhardt et al. | 340/825.49 |

* cited by examiner

Primary Examiner—George A Bugg
Assistant Examiner—Son M Tang
(74) Attorney, Agent, or Firm—Priest & Goldstein, PLLC; Harden E. Stevens, III (57) ABSTRACT

A system for displaying an information package which achieves improved accuracy in the delivery of an advertising campaign. The system includes a remotely readable identification tag for holding an identifier, an interrogator for selectively remotely interrogating the tag to read the identifier, a processor responsive to the identifier read from the tag for obtaining, from a database, segment information that is associated with the identifier, and also responsive to the obtained segment information for designating the information package, and an information display unit for displaying the information package is also provided.

17 Claims, 4 Drawing Sheets

SYSTEM FOR DISPLAYING AN INFORMATION PACKAGE

BACKGROUND OF THE INVENTION

The present invention relates generally to marketing and advertising and, more specifically, to a system and method for displaying an information package.

Many industries invest considerable capital in studying the buying trends and habits of their customers. Based on these studies, they divide their customer base into market segments comprising one or a large number of customers whose attributes are similar. Advertising campaigns are designed with reference to these market segments, and directed specifically towards one or more of those segments. These segments, at least theoretically, include the portion of the customer base that would be most responsive to the respective advertising campaign. Delivering an advertising campaign to the desired customer or customers is difficult, and is the only result that can justify the capital spent on studying and segmenting the population, designing the campaign and implementing the campaign.

Therefore, it would be beneficial provide a system and method of displaying an information package that would achieve improved accuracy in the delivery of an advertising campaign.

Although the invention is described by reference to its application in marketing and advertising, it will be appreciated that it is not limited to that field of application.

SUMMARY OF THE INVENTION

In accordance with the teachings of the present invention, a system and method for displaying an information package is provided.

The system comprises a remotely readable identification tag for holding an identifier, an interrogator for selectively remotely interrogating the tag to read the identifier, a processor responsive to the identifier read from the tag for obtaining, from a database, segment information that is associated with the identifier, and also responsive to the obtained segment information for designating the information package, and an information display unit for displaying the information package is also provided.

The method includes the steps of storing an identifier on a remotely readable identification tag, selectively remotely interrogating the tag to read the identifier, being responsive to the identifier read from the tag for obtaining, from a database, segment information that is associated with the identifier, being responsive to the obtained segment information for designating the information package, and displaying the designated information package.

According to another aspect of the invention, there is provided an electronic terminal for providing a primary functionality and which is responsive to an access token for allowing a holder of the token to access that primary functionality, the token having a remotely readable identifier, and the terminal including an interface for interacting with the token to allow the holder to selectively access the primary functionality, an interrogator for selectively remotely reading the identifier, a processor that is responsive to, the identifier read from the token for obtaining, from a database, segment information that is associated with the identifier and the obtained segment information for designating an information package, and an information display unit for displaying the information package to the holder.

According to another aspect of the invention, there is provided a system for displaying an information package, the system comprising a remotely readable identification tag for holding an identifier, an interrogator for selectively remotely interrogating the tag to read the identifier, a processor that is responsive to the identifier read from the tag for obtaining, from a database, personalised information that is associated with the identifier, and responsive to the obtained personalised information for designating the information package, and an information display unit for displaying the information package.

It is accordingly an object of the present information to provide a system and method for displaying an information package.

It is another object of the invention to provide a system and a method for displaying an information package in response to a remotely readable identification tag holding an identifier, and segment information associated to that identifier.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENTS

Referring to the drawings, several embodiments of the invention are illustrated. It will be appreciated that in the different figures that corresponding features have been denoted by corresponding reference numerals.

Figure 1:
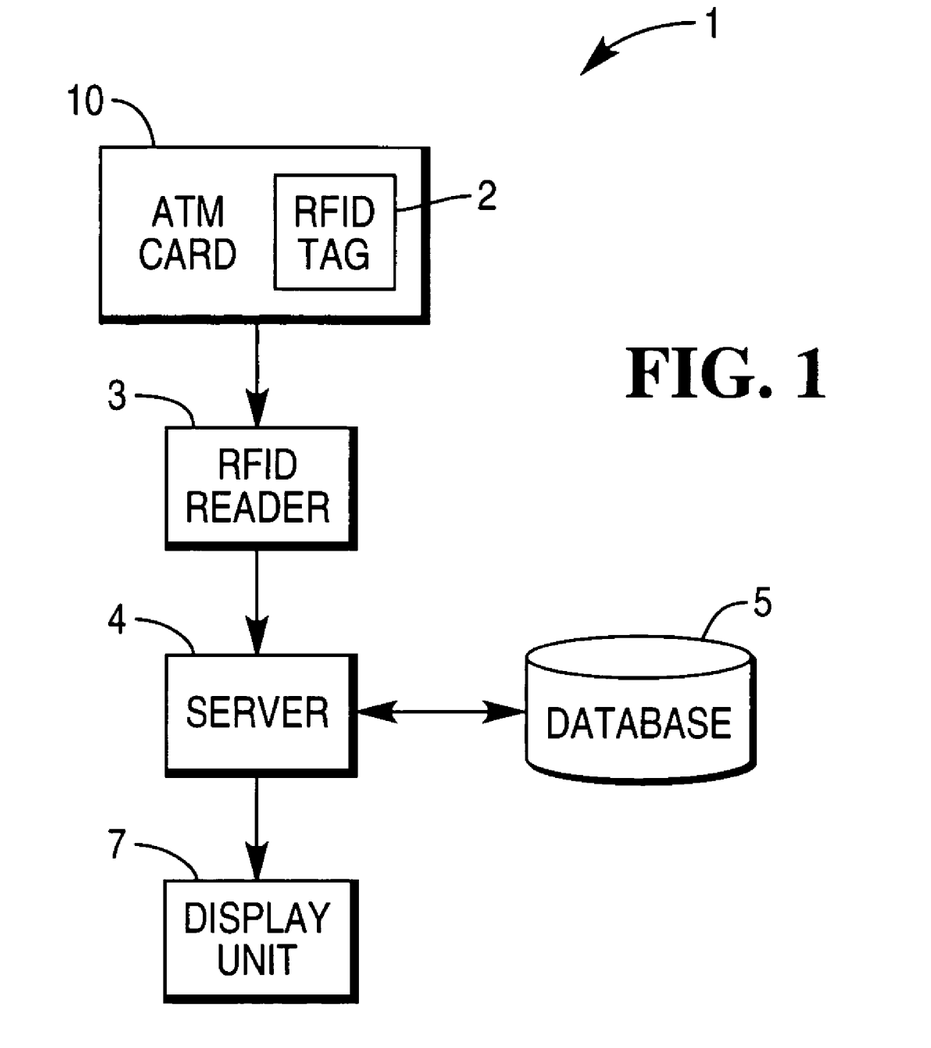
FIG. 1 is a schematic view of a system according to the invention.

Referring initially to FIG. 1, system 1 includes a remotely readable identification tag, in the form of a radio frequency identification (RFID) tag 2, which holds an identifier (not shown). An interrogator, in the form of a RFID reader 3, selectively remotely interrogates tag 2 to read the identifier. In alternate embodiments, technology other than RFID is implemented. A processor, in the form of server 4, is responsive to the identifier read from tag 2 for obtaining, from a database 5, segment information that is associated with the identifier. Server 4 is also responsive to the obtained segment information for designating an information package in the form of an advertising campaign. An information display unit 7 is provided for displaying the advertising campaign.

The identifier is an electronically held piece of unique data that is hard-coded to the tag at the time of manufacture. In some embodiments, the identifier is an eight byte character string, while in other embodiments it is of an alternative length.

Tag 2 is mounted within a secondary substrate that, in this embodiment, is a magnetic strip ATM card 10. Tag 2 was inserted into card 10 during its manufacture. It will be appreciated by those skilled in the art that a variety of secondary substrates are suitable for use in other embodiments. For example, in some embodiments the substrate includes a credit card, an item of clothing, a consumer electronic device, a promotional token, or packaging for an item. In alternative embodiments, the tag is embedded in, encased by, adhered to, attached to or otherwise fixedly connected with the substrate.

The secondary substrate has a first or primary function, that being: to allow a given person to access predetermined banking facilities. In other embodiments, the first function is otherwise. For example, in an embodiment where the substrate is a packaging, the first function is to protect the packaged item, and to display branding and other information. The tag 2 also provides a second function that is associated with, but which is in addition to, the first function. The availability of a first function and a second function will be described further below, together with the synergies that arise from the collective inclusion of those functions in a single item.

Figure 2:
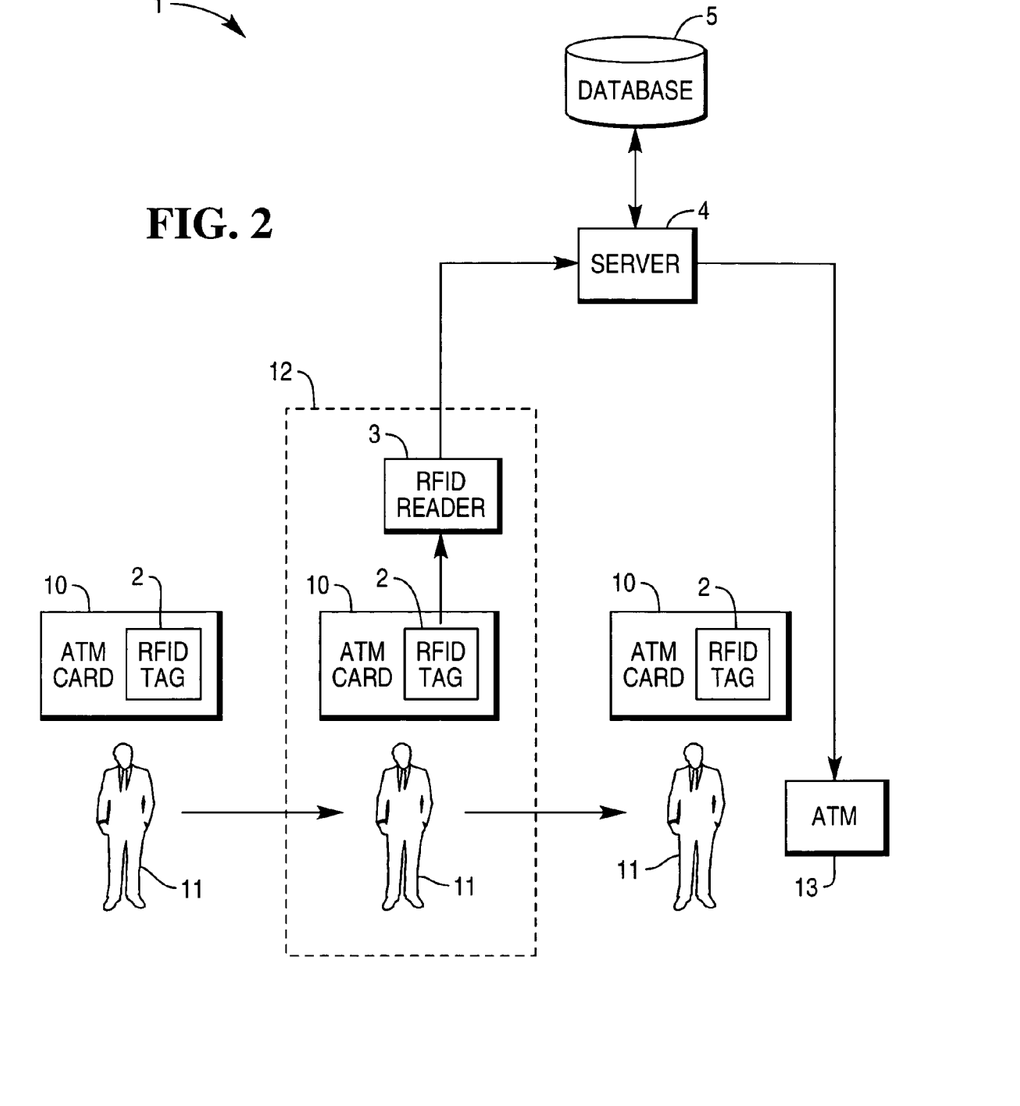
FIG. 2 is a schematic view of a first embodiment of the invention.

Card 10 is distributed to a target, being the person to whom the information package is intended to be directed. For the embodiment illustrated in FIG. 2, the target is the account holder 11 for the account with which card 10 is associated. It will be appreciated that in other embodiments that utilise alternate substrates the target will be selected with reference to the substrate used. For example, where the substrate is a corporate service card, the target would be the company to which the card is distributed. That is, the target need not be an individual person, although ultimately the card would be placed in the hands of, and used by, a person within the company with the necessary authorisation.

The identifier is held electronically on card 10 and is uniquely attributable to account holder 11. Database 5 also includes records of the identifiers, and creates associations between those identifiers and segment information held on database 5. In a preferred embodiment, the associated segment information is based on the attributes of account holder 11—for example age, sex, occupation and/or other demographic information—which are stored in database 5.

The exact nature of the information held in database 5 and which is used in the embodiments of the invention varies between the specific application of the embodiments and the degree to which the market has been segmented in that application. For example, in some applications—for example, where individual name badges including embedded RFID tags are issued to delegates attending an international conference in a given venue—the segmentation occurs at the level of the nation from which the respective delegates originate or represent. However, in other embodiments, where the tag is included in an ATM card, the segmentation is known to occur more specifically, say to the sex and age bracket of the person. In all cases, the segmentation is able to be driven by the specificity of the placement of advertising information that is sought, although the greater the level of segmentation, typically the greater the requirement for prior accumulation of relevant data within database 5.

In the present embodiment, system 1 is described with reference to an application in marketing of goods and/or services to account holder 11. More specifically, system 1 is used to deliver an advertising campaign to account holder 11. An advertising campaign is designed with a particular class of prospective customers in mind, this class of customers belonging to one or more particular market segments. The advertising campaign is directed towards those market segments. For example, some advertising campaigns are directed towards one or more of the following market segments:

Persons belonging to a particular age bracket;
Persons known to be users of certain banking facilities, such as home loans;
Persons who have dependant children;
Persons working in particular industries; and
Persons in particular financial positions.

In some embodiments, market segments are also defined as the intersection or union of other market segments.

The attributes of a customer determine the market segments to which that customer belongs. Preferably a predetermined selection of market segments is defined when the advertising campaign is designed. In some embodiments only a few market segments are used, such as embodiments only making use of age or gender distinctions. In other embodiments a relatively large number of market segments are used. In some embodiments, market segments are defined such that each customer belongs to a unique market segment, allowing for the delivery of uniquely tailored advertising campaigns. Preferably, such uniquely tailored advertising campaigns display the name of account holder 11.

In preferred embodiments, attributes of customers such as account holder 11 are collected over time and constantly updated. Preferably a Customer Relationship Management (CRM) system is used to collect and store these attributes, and associate account holder 11 with segment information indicative of the market segments to which account holder 11 belongs. In such embodiments, database 5 operates in conjunction with the CRM system. Such an approach ensures that the association of the identifier with appropriate market segments occurs based on the currently known attributes of account holder 1. The manner in which a CRM system collects and stores attributes will be well known to those skilled in the art.

In this embodiment of the invention both database 5 and the CRM system are implemented in respective Teradata relational databases provided by NCR. However, in other embodiments, alternative database solutions are used.

Returning to FIG. 1, reader 3 reads the identifier when one or more predetermined conditions are satisfied. In some embodiments a predetermined condition includes the tag being disposed within a preselected interrogation zone 12 provided by the reader. The range of reader 3 often defines this interrogation zone although, in other embodiments, a plurality of interlinked readers is used. In the present embodiment, interrogation zone 12 is a region though which a person 11 will pass when approaching an ATM 13. That is, reader 3 is disposed adjacent to ATM 13 for providing an interrogation field in the space through which person 11 moves to access ATM 13.

Reader 3 maintains the interrogation field continuously—at least during predetermined times—to detect the presence of a tag in zone 12. Once the presence of a tag is detected, the reader obtains from the tag data indicative of the identifier held on that tag. This data is communicated to server 4 which, in response, obtains the segment information associated with the identifier from database 5. This segment information is used by server 4 to determine the market segment to which account holder 11 belongs. In response to this, server 4 designates the information package that is intended to be displayed to the person.

It will be appreciated that in circumstances where zone 12 includes more than one tag at any given time, reference is had to which of cards 10 is actually inserted into ATM 13. In other embodiments, reader 3 is configured to ensure that zone 12 is unlikely to have more than one person in it at any one given time.

In this embodiment, the information package is selected from a plurality of advertising campaigns that are available for conveying respective messages about one or more products and/or services. Each advertising campaign relates to a particular market segment. However, in other embodiments, there are a plurality of advertising campaigns for each market segment. Preferably, the advertising campaigns are related to the goods and/or services of the financial institution who's branding is associated with ATM 13. In other embodiments, the advertising campaigns are related to the goods and/or services of another party.

In the present embodiment, server 4 is provided with a plurality of advertising campaigns, each being directed to one or more market segment. In some embodiments server 4 is provided with a single advertising campaign. Server 4 designates an advertising campaign directed to the market segment of account holder 11, and instructs display unit 7 to display the designated advertising campaigns. In the present embodiment, display unit 7 is a screen of ATM 13. In other embodiments, unit 7 is an independent display mounted on or near to ATM 13.

In some embodiments, a single advertising campaign is directed to more than one market segment. In alternative embodiments a plurality of advertising campaigns are directed to each market segment and server 4 selects one of these advertising campaigns in accordance with a predetermined protocol. For example, by: cycling through the available advertising campaigns; being responsive to the time of day that the holder uses ATM 13; and the number of advertising campaigns shown over an earlier period. In some embodiments where each account holder belongs to a unique market segment, ATM 13 displays an advertising campaign uniquely directed towards account holder 11, preferably identifying account holder 11 by name.

In a preferred situation, account holder 11 wishes to use card 10 in ATM 13 to exercise the first or primary function of card 10. As such, account holder 11 approaches ATM 13 and, in doing so, passes though interrogation zone 12. Reader 3 reads the identifier on tag 2 of card 10, and server 4 is responsive to the identifier to select and designate an advertising campaign based on the market segment of account holder 11. That is, the second function—that of selecting an advertising campaign appropriate for the account holder—is able to be determined as the account holder approaches ATM 13, and without interfering or delaying the provision of the primary function being sought. As a result, when account holder 11 reaches ATM 13, the selected advertising campaign that is directed to the market segment of account holder 11 is displayed on display unit 7. On the basis of the teaching herein, those skilled in the art will recognise the value of this result.

It is appreciated that, in certain circumstances, a person other than account holder 11 carries card 10 though interrogation zone 12. In such circumstances, the advertising campaign displayed on display unit 7 is directed to account holder 11 rather than the person wishing to use the ATM. It is considered that such circumstances would be relatively rare occurrences.

As a specific example, account holder 11 regularly deals with the financial institution who's branding is associated with ATM 13, referred to as Bank X. Bank X maintains a CRM system that periodically gathers information about account holder 11. The trigger or triggers for gathering the information varies between embodiments, but in this case is initiated by transactions, enquiries, requests for information, and the like by holder 11 in respect of the bank account. More specifically, in this example, the CRM system of Bank X has gathered information that account holder 11 is 24 years of age, is female, and has obtained a car loan from Bank X. This information is stored in database 5.

Bank X is in the process of marketing its car insurance policies. One of these policies is specifically tailored for female drivers under the age of 25. The marketing department of Bank X designed an advertising campaign to market the policy—which is referred to as advertising campaign Y. Advertising campaign Y is directed towards the market segment that represents female drivers under the age of 25—which is referred to as market segment Z. In the present embodiment, market segment Z is defined to include females under the age of 25 who have applied for car loans. In other embodiments market segment Z is defined more broadly, for example in some embodiments it is defined to include all females under the age of 25.

Typically an advertising campaign is designed to be delivered through one or more media. In this embodiment campaign Y is to be delivered by a variety of media, including print, radio, television, and ATM screens—such as that on ATM 13.

Bank X uses system 1 to deliver advertising campaign Y to the desired consumers—being consumers that are members of market segment Z. To put effect to this, database 5 is uploaded with the appropriate definition of market segment Z, and uses the stored attributes to associate the relevant customers to market segment Z. This will include account holder 11, who is known to belong to market segment Z as a result of the attributes that were collected by the CRM system used by Bank X, as described above. Server 4 is uploaded with instructions to deliver the advertising campaign each time a tag 2 containing an identifier associated with market segment Z is determined to have entered interrogation zone 12.

When account holder 11 approaches ATM 13 with her card 10, reader 3 reads the identifier of tag 2 and communicates the identifier to server 4. Server 4 then communicates with database 5 and obtains segment information, which will inform server 4 that account holder 11 belongs to market segment Z. As such, server 4 designates an information package in the form of advertising campaign Y. Advertising campaign Y is then displayed on display unit 7, being the screen of ATM 13. Preferably this occurs simultaneously or momentarily prior to account holder 11 interacting with ATM 13. As a result, advertising campaign Y is delivered to a member of market segment Z, and the advertising space that is the screen of ATM 13 is used in an inefficient manner.

For the sake of the present example, Bank X also has a car insurance policy tailored towards female drivers over the age of 40. This is marketed through a different advertising campaign—referred to as advertising campaign V—which is directed towards a different market segment—referred to as market segment W. Market segment W is defined in database 5 as females over the age of 40. It will be appreciated that account holder 11 would be relatively unresponsive to advertising campaign V. Server 4 would not designate advertising campaign V upon reader 3 reading the identifier of account holder 11, and as a result the advertising space that is the screen of ATM 13 is not used in an inefficient manner. It will be appreciated that advertising campaign V would, however, be displayed when a holder of a card 10 having a tag 2 with identifier associated to market segment W uses ATM 13.

It will be appreciated that, in preferred embodiments, a plurality of tags having respective identifiers are used. This ranges from only a few tags in some embodiments, up to thousands or tens of thousands of tags in other embodiments. In some embodiments all the tags are contained on similar secondary substrates such as card 10, whilst in other embodiments a variety of substrates are used.

In embodiments utilising a plurality of tags having respective identifiers, the interrogator reads the identifiers and the server selects the information package in response to the identifiers.

An alternative embodiment of the invention (not shown) integrates system 1 with a point of sale terminal in a retail establishment. Accordingly, as the customer—the equivalent of card holder 11—approaches the point of sale terminal, the relevant advertising campaign is selected, and displayed. In this embodiment, the card in which the tag is embedded is a loyalty card for the retail establishment. That is, the first or primary function of the card is to identify the customer for the purposes of providing rewards based upon their purchase history with the establishment. The secondary functionality is, as with the FIG. 1 embodiment, the provision of targeted advertising to the card holder.

It will be appreciated that where the establishment includes a plurality of point of sale terminals—either at a single site, or spread over a plurality of sites—system 1 is able to be integrated with these terminals over a WAN or other network.

It will also be appreciated that in some embodiments, one or more of the point of sale terminals are automated or "self check out" terminals.

Figure 3:
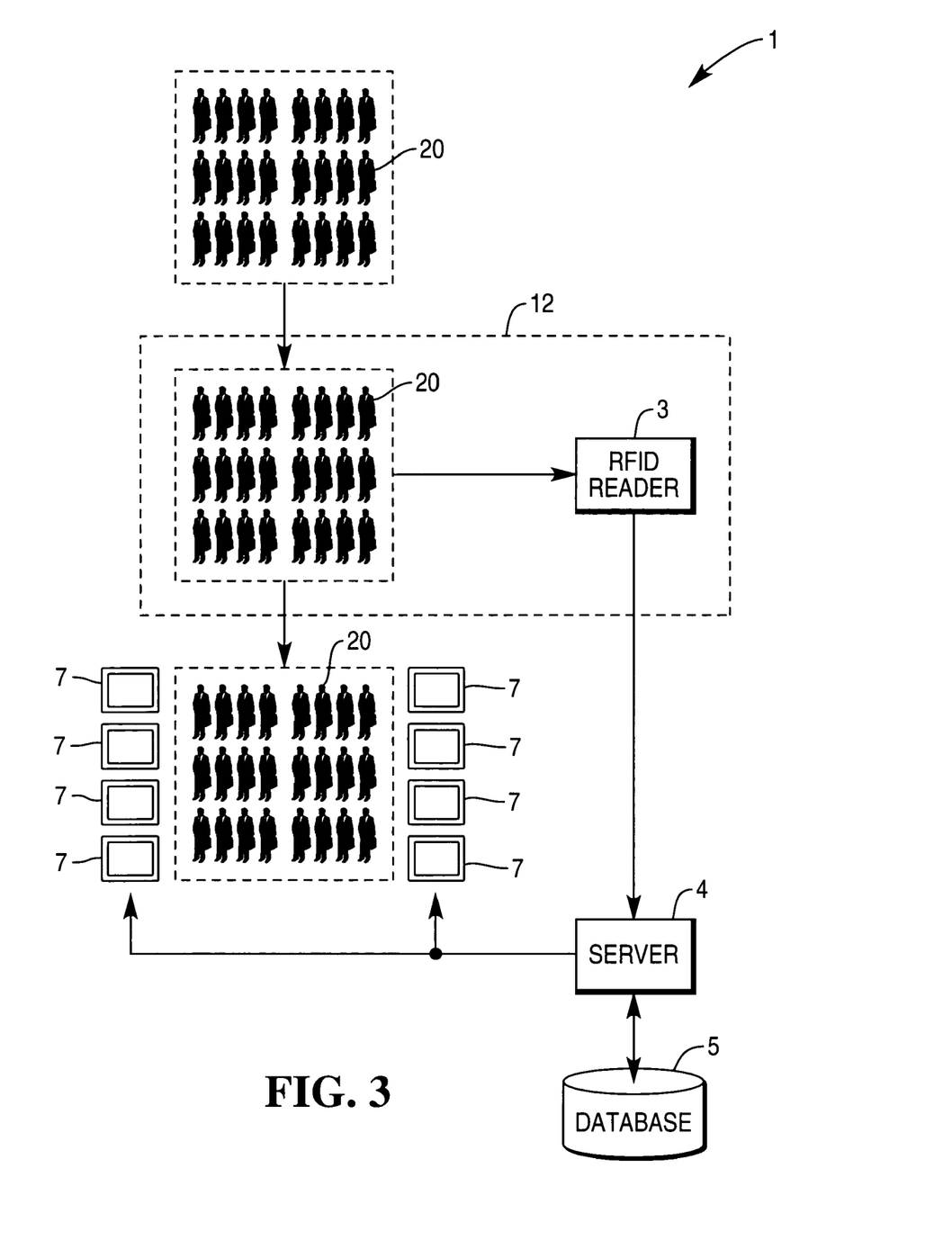
FIG. 3 is a schematic view of a third according of the invention.

FIG. 3 illustrates an embodiment where a plurality of consumers 20, each carrying a respective tag 2, approach a series of display units 7. It is assumed that the consumers 20 are also the targets to whom the respective tags 2 were distributed, but nevertheless appreciated that this will not necessarily occur in practice as outlined above.

In this embodiment, consumers 20 enter a train station wishing to board a train. As they enter the station, consumers 20 pass through interrogation zone 12 and reader 3 reads the identifiers from the respective tags. A plurality of display units 7 is disposed along the path between interrogation zone 12 and the train. Server 4 receives the identifiers from reader 3 at predetermined time intervals, and obtains the associated market segments from database 5. Server 4 is responsive to the market segments of consumers 20 to select advertising campaigns that will be displayed on display units 7 while the relevant consumers are likely to be viewing units 7. In some embodiments the selection is based on the identifier of a randomly chosen group of consumers 20, whilst in other embodiments the prevalence of certain market segments across consumers 20 is a factor in the selection process.

In this embodiment there is an intentional time delay between a consumer 20 passing though interrogation zone 12 and an advertising campaign directed to the market segment of that particular consumer 20 being displayed on one of display units 7. This takes into account the time it takes for consumer 20 to travel from zone 12 to a specific display unit 7.

Figure 4:
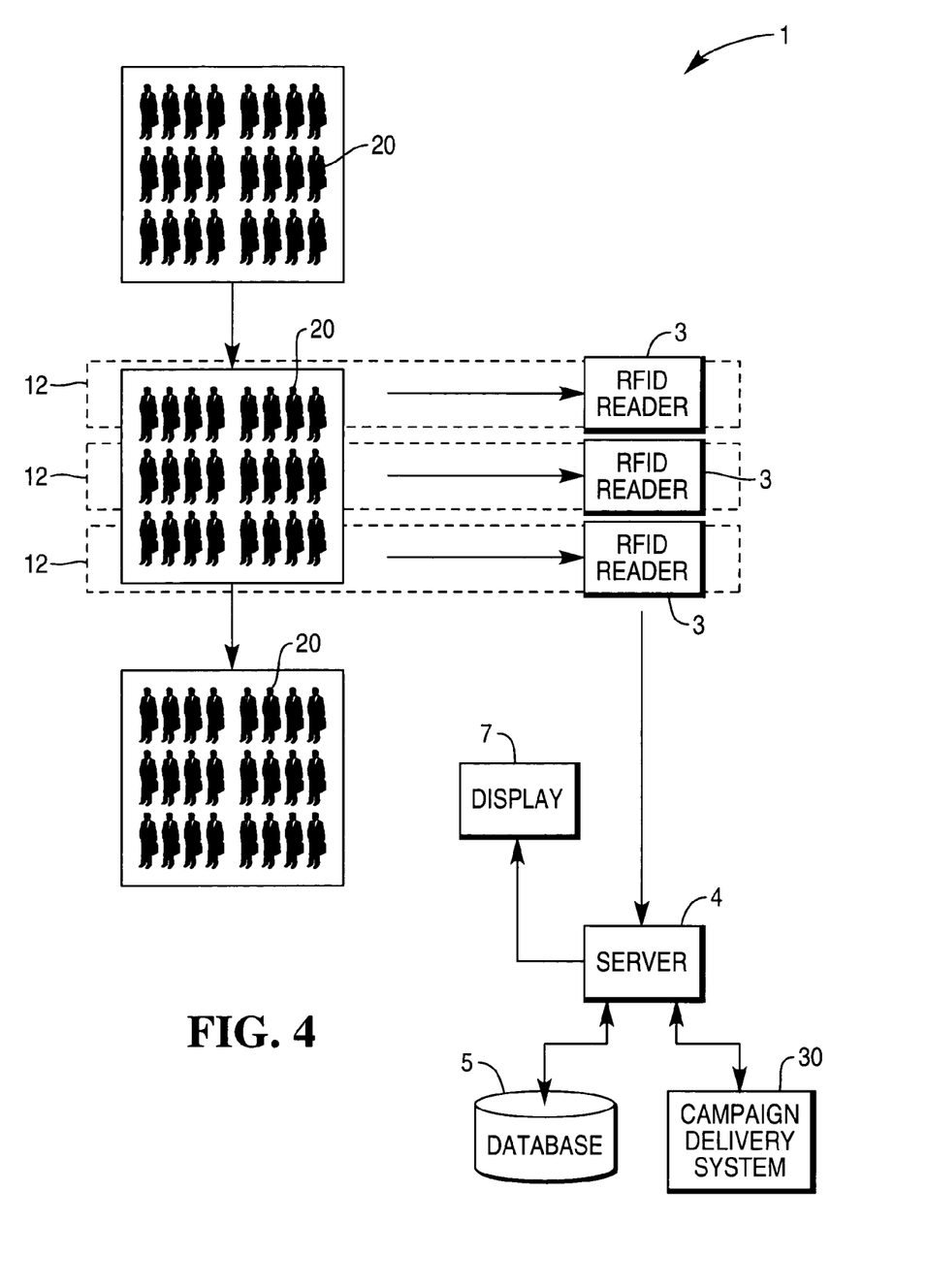
FIG. 4 is a schematic view of a fourth embodiment of the invention.

FIG. 4 illustrates an embodiment where a single display unit displays, typically sequentially, advertising campaigns to a plurality of consumers 20 each carrying tags 2. This embodiment is described with reference to a football stadium. It will be appreciated that it is equally applicable to other venues where a number of consumers 20 concurrently receive information from a single display unit 7, such as movie theatres, shopping centres, airports and consumer aeroplanes.

As consumers 20 enter the stadium, they pass through interrogation zones 13. In this embodiment there are multiple readers 3 and interrogation zones 13 to account for the large number of general entrances to the stadium. Preferably one reader 3 is provided for each entry turnstile. All of the readers 3 are in communication with a single server 4.

The display unit 7, which in this embodiment is a stadium screen, displays a plurality of advertising campaigns prior to, during and following the football game. In selecting the advertising campaigns that will be displayed on display unit 7, server 4 is responsive to the proportions of the identifiers associated with like market segments. Server 4 uses database 5 to determine the market segment for each identifier and, for example, determines that 70% of consumers 20 belong to market segment A, and 30% belong to other market segments.

In such a case, server 4 instructs display unit 7 to display more advertising campaigns related to market group A than advertising campaigns related to other market segments.

The proportions of proportions of the identifiers associated with like market segments will vary as consumers 20 enter the stadium, and the selected advertising campaigns will reflect this. In some embodiments readers 3 are also used to notify server 4 when consumers 20 leave the stadium. As such, display unit 7 displays advertising based on the current composition of consumers in the stadium.

In some embodiments a Campaign Delivery Server (CDS) 30 is used. CDS 30 contains a plurality of advertising campaigns available for display on display unit 7. This will include a plurality of advertising campaigns related to each market segment, and advertising campaigns used by a plurality of clients. Server 4 communicates with CDS 30 when selecting the advertising campaign, making the selection in accordance with a predetermined protocol. This protocol is preferably reliant on advertising purchase arrangements between the administrator of system 1 and third party clients. Those skilled in the art will understand the various protocols that are implemented in such situations. In some embodiments CDS 30 is integrated into server 4.

In a specific example, system 1 is used during a football game under the control of an administrator. In this example, use is made of CDS 30. There are to be 30 minutes of advertising time available on display unit 7—being the stadium screen—during the football game. Prior to the game, the administrator sells this advertising time to various clients, in this case, clients X, Y and Z, each of which purchase 10 minutes of this time. The administrator uploads the details of the amounts of time purchased to CDS 30.

Client X provides advertising campaigns A, B and C to the administrator of system 1, these being directed to market segments A, B and C respectively. The age brackets of consumers 20 determine the compositions of market segments A, B and C, all possible ages being included by these brackets. The administrator uploads these advertising campaigns to CDS 30.

Client Y provides advertising campaigns D1 and D2, and campaigns E1 and E2 to the administrator, these being directed to market segments D and E respectively. For the purposes of illustration, the gender of each consumer 20 determines whether they belong to segment D or E. Client Y instructs the administrator how much time should be allocated to the campaigns directed to like market segments. In this example an equal amount of time is to be allocated, that is, D1 will be shown for the same amount of time as D2, and E1 will be shown for the same amount of time as E2. The administrator uploads campaigns D1, D2, E1 and E2 to CDS 30, along with the details of Client Y's instructions.

Client Z provides advertising campaigns F and G to the administrator. These are directed to market segments F and G respectively. Market segment F denotes males under the age of 25, whilst market segment G denotes males over the age of 25. The administrator uploads these advertising campaigns to CDS 30.

As consumers 20 pass through interrogation zones 13, readers 3 communicate the identifiers to server 4. Server 4 uses database 5 to determine the market segment for each identifier. It will be appreciated that many of consumers 20 will belong to more than one of segments A through G. In this specific example, server determines that 70% of consumers 20 belong to segment A, 30% to segment B, 0% to segment C, 80% to segment D, 20% to segment E, 40% to segment F and 40% to segment G. Server 4 communicates this information to CDS 30.

CDS 30 uses the information provided by server 4 to map out the advertising campaigns that are to be shown during the 30 minutes of advertising time during the football game. Appropriate software for carrying out this task will be well known to those skilled in the art and, on the basis of the teaching herein, will be able to be configured appropriately. In this example, CDS 30 determines the following time allowances:

9 minutes to campaign A;
1 minute to campaign B;
0 minutes to campaign C;
4 minutes to campaign D1;
4 minutes to campaign D2;
1 minute to campaign E1
1 minute to campaign E2
5 minutes to campaign F
5 minutes to campaign G.

CDS 30 is then responsive to the length of each of the campaigns to allocate time codes for the showing of each campaign, these time codes being indicative of times during the 30 minutes of available advertising time. In other embodiments administrator 30 allocates the time codes manually. Preferably, when allocating time codes, CDS 30 ensures that the same campaign is not shown on consecutive occasions. CDS 30 instructs server 40 to designate the appropriate campaigns in accordance with these time codes.

In some embodiments CDS 30 makes an allowance to show campaign C for a limited amount of time, the rationale being to allow for persons in the stadium who are not in possession of tags 2. This follows the instructions of Client X, and is taken from the time purchased by Client X.

While the above embodiments make use of RFID tags for supplying the identifier to the server, in other embodiments alternative portable identifier storage devices are used. For example, in another embodiment use is made of onboard storage on a PDA or laptop computer, and the communications with the interrogator is by WiFi or another wireless protocol.

The information package that is selected in the above embodiments is an advertising campaign. In other embodiments, however alternative information packages are used and displayed. In one such embodiment, the identifier is associated with gender, age and preferred language information, and the information packages are in the form of advisory warnings or guidance. For example, in an airport or other public building card holders are alerted to any age or gender specific facilities within the building. In further embodiments, unauthorised persons approaching, say, an access door to a secure area, are provided a visual and/or audible warning in their preferred language.

The term "advertising campaign" as used in this description of the preferred embodiments is intended to include one or more specific advertisements that are typically directed to one, or a predetermined intersection of market segments. The actual advertisements included within a given campaign may change during the period of the campaign.

Although the present invention has been described with particular reference to certain preferred embodiments thereof, variations and modifications of the present invention can be effected within the spirit and scope of the following claims. The present invention also has applicability in tracking for purposes besides displaying advertising.

The invention claimed is:

1. A system for displaying an information package, the system comprising:
   a remotely readable identification tag for holding an identifier;
   an interrogator for selectively remotely interrogating the tag to read the identifier;
   a processor that is responsive to:
      the identifier read from the tag for obtaining, from a database, market segment information that is associated with the identifier, the market segment information being associated with demographic information relating to a market segment to which a person associated with the identifier belongs, database information associated with the identifier being updated on an ongoing basis as demographic information about the person associated with the identifier continues to be collected; and
      the obtained market segment information for designating the information package; and
   an information display unit for displaying the information package.

2. A system according to claim 1 including a plurality of tags having respective identifiers.

3. A system according to claim 1 wherein the tag is carried by a tag holder and the information display unit displays the designated information package to the holder.

4. A system according to claim 1 wherein the tag is distributed to a respective target and the associated segment information is based on attributes of the respective target.

5. A system according to claim 4 wherein the database includes the attributes of the respective target.

6. A system according to claim 1 wherein the interrogator reads the identifier when one or more predetermined conditions are satisfied.

7. A system according to claim 6 wherein one of the predetermined conditions includes the tag being disposed within a preselected interrogation zone provided by the interrogator.

8. A system according to claim 1 wherein designating the information package includes selecting the information package from a plurality of information packages.

9. A system according to claim 8 including a plurality of tags having respective identifiers, wherein the interrogator reads the identifiers and the processor selects the information package in response to the identifiers.

10. A system according to claim 9 wherein the selection is responsive to the proportions of the identifiers associated with like segment information.

11. A system according to claim 8 wherein the RFID tag is contained in a secondary substrate.

12. A system according to claim 11 wherein the secondary substrate is selected from:
   an ATM card;
   a credit card;
   an item of clothing;
   a consumer electronic device;
   a promotional token; and
   packaging.

13. A system according to claim 1 wherein the tag comprises a RFID tag.

14. A method for displaying an information package, the method comprising the steps of:
   storing an identifier on a remotely readable identification tag;
   selectively remotely interrogating the tag to read the identifier;
   being responsive to:

the identifier read from the tag for obtaining, from a database, market segment information that is associated with the identifier, the market segment information being associated with demographic information relating to a market segment to which a person associated with the identifier belongs, database information associated with the identifier being updated on an ongoing basis as demographic information about the person associated with the identifier continues to be collected; and the obtained market segment information for designating the information package; and displaying the designated information package.

15. A system for displaying an information package, the system comprising:

a remotely readable identification tag for holding an identifier;

an interrogator for selectively remotely interrogating the tag to read the identifier;

a processor that is responsive to:
  (a) the identifier read from the tag for obtaining, from a database, personalized information that is associated with the identifier;
  (b) the personalized information for identifying a market segment to which a person associated with the identifier belongs, identification of a market segment being based on demographic information defining the market segment, database information associated with the identifier being updated on an ongoing basis as demographic information about the person associated with the identifier continues to be collected; and the obtained personalized information and information related to the market segment for designating the information package; and an information display unit for displaying the information package.

16. An electronic terminal for providing a primary functionality and which is responsive to an access token for allowing a holder of the token to access that primary functionality, the token having a remotely readable identifier, and the terminal including:

an interface for interacting with the token to allow the holder to selectively access the primary functionality;

an interrogator for selectively remotely reading the identifier;

a processor that is responsive to:
  the identifier read from the token for obtaining, from a database, market segment information that is associated with the identifier, the market segment information being associated with demographic information relating to a market segment to which a person associated with the identifier belongs, database information associated with the identifier being updated on an ongoing basis as demographic information about the person associated with the identifier continues to be collected; and the obtained segment information for designating an information package; and an information display unit for displaying the information package to the holder.

17. A terminal according to claim 16 that is one of:
an ATM;
information kiosk;
ticketing machine;
vending machine;
point of sale terminal;
EFTPOS; and
gaming machine.

* * * * *